Figures 1, 2:
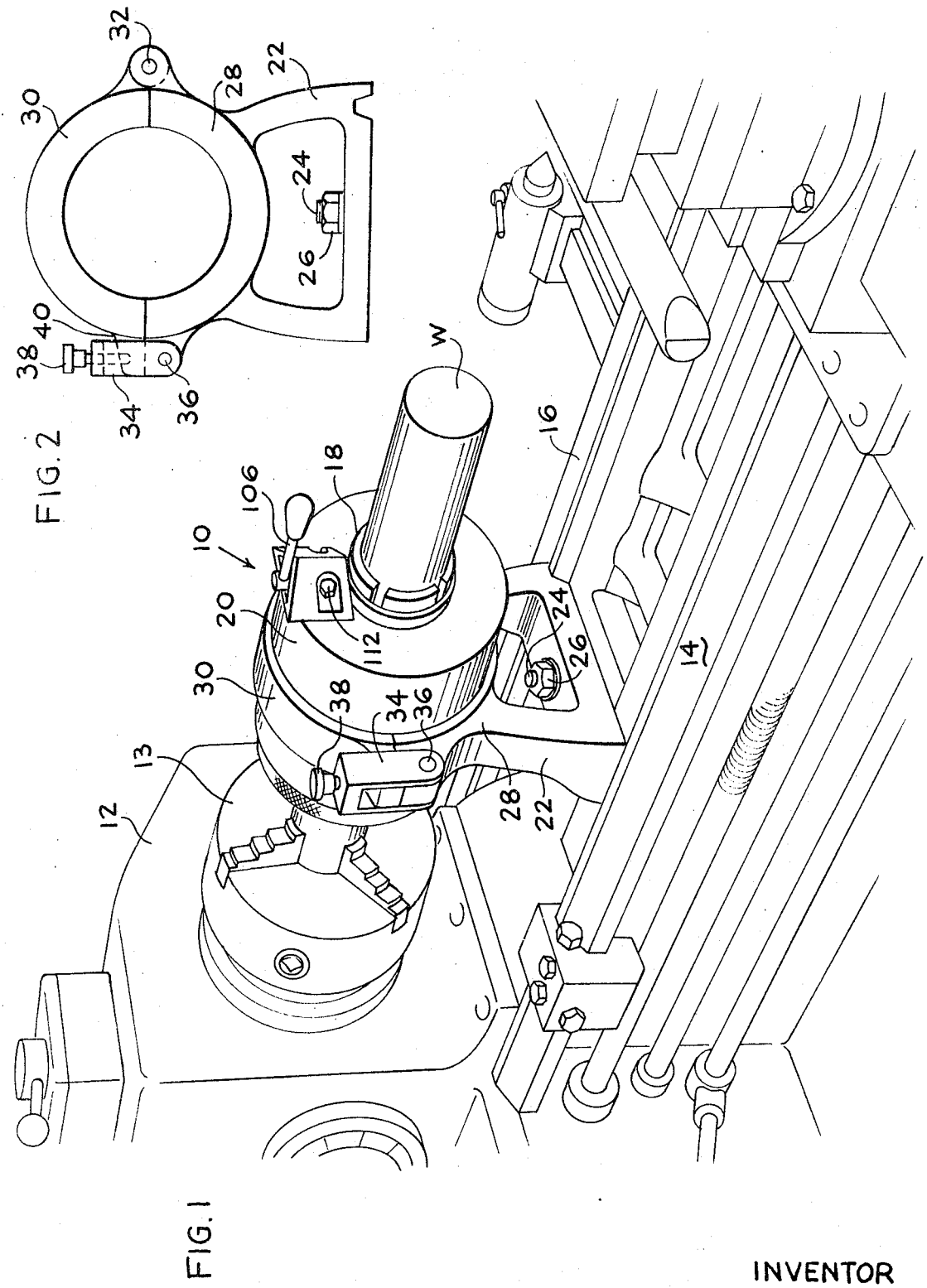

United States Patent
Kladich

[15] 3,664,216
[45] May 23, 1972

[54] SELF-CENTERING STEADY REST CHUCKS

[72] Inventor: Joseph Kladich, 100 Rowena Drive, Don Mills, Ontario, Canada

[22] Filed: June 14, 1968

[21] Appl. No.: 737,071

[52] U.S. Cl. .................................................. 82/38, 279/52
[51] Int. Cl. ...................................................... B23b 25/00
[58] Field of Search ........................... 82/38, 39; 279/52, 50

[56] References Cited

UNITED STATES PATENTS

| 258,000 | 5/1882 | Balsbaugh | 82/39 |
| 1,251,209 | 12/1917 | Fisher | 82/39 X |
| 2,369,330 | 2/1945 | Wilson | 82/38 |
| 3,280,674 | 10/1966 | Sirola | 82/39 X |

FOREIGN PATENTS OR APPLICATIONS

| 513,393 | 10/1939 | Great Britain | 82/38 |
| 76,361 | 11/1954 | Netherlands | 82/38 |

Primary Examiner—Leonidas Vlachos
Attorney—W. Britton Moore

[57] ABSTRACT

A steady rest for use with a lathe has a non-rotatable housing which is suitably secured to the lathe and which supports for rotation therein a self-centering chuck for securing a workpiece extending through the steady rest. The collet member of the chuck has axially extending fingers which are radially flexed or released respectively to engage or disengage the workpiece on relative axial movement of such collet member and a sleeve surrounding that member, by virtue of the provision of co-operating frusto-conical surfaces on said collet member and said sleeve. An internally threaded adjusting collar engages a corresponding thread on the collet member and abuts the end of the sleeve, so that the collet member is moved axially and the collet fingers move radially when the adjusting collar is rotated relative to the collet member. A pin is radially retractably mounted through the housing for releasable engagement with the sleeve to hold such sleeve stationary and to facilitate tightening or releasing of the collet fingers on the workpiece. A ratchet and pawl mechanism is provided between the adjusting collar and the collet member to prevent their relative rotation and loosening of the collet fingers from the workpiece during operation of the lathe.

5 Claims, 7 Drawing Figures

PATENTED MAY 23 1972　3,664,216

SHEET 1 OF 3

INVENTOR
JOSEPH KLADICH
BY: 
ATTORNEY

INVENTOR
JOSEPH KLADICH
BY: [signature]
ATTORNEY

INVENTOR
JOSEPH KLADICH
BY: *Britton Moore*
ATTORNEY

3,664,216

SELF-CENTERING STEADY REST CHUCKS

The present invention relates to a steady rest for use with a machinist's lathe.

It is established practice to utilize a steady rest when carrying out machining operations on long or on relatively flexible workpieces or when machining the exposed end surface of a workpiece supported in the chuck of a lathe. Many of the previously known steady rests have presented the serious disadvantage that they are relatively difficult to set up, requiring considerable care and time to ensure that the workpiece is axially centered in both the lathe chuck and in the steady rest itself. Such centering of a workpiece in a steady rest has frequently required the separate adjustment of three centering screws.

Another problem which frequently arises with existing steady rests is that shims must often be used to prevent damage by the jaws of the steady rest to the outer surface of the workpiece. Such use of shims may in itself make the centering operation even more difficult and time-consuming.

It is, accordingly, a principal object of the present invention to provide a steady rest for use with a lathe and which is free of the aforementioned disadvantages.

It is particularly an object of the present invention to provide a steady rest in which the centering of a workpiece is effected automatically.

It is yet another object of the present invention to provide a steady rest which does not normally require the use of shims for avoiding damage to a workpiece supported therein.

Yet another object of the present invention is to provide a steady rest which can easily be adapted for use with cylindrical workpieces having a wide range of external diameters.

These and other objects are achieved in accordance with the present invention by a steady rest comprising a rotatable self-centering chuck mechanism for securing a workpiece extending therethrough and mounted for free rotation with a non-rotatable housing adapted to be secured to a lathe.

The self-centering chuck mechanism of a steady rest according to the invention may usefully comprise a generally cylindrical sleeve and an axially adjustable collet member disposed therein, said collet member having at least three, and preferably four, equi-angularly radially spaced and axially extending fingers for gripping a workpiece, the radial positions of all said fingers being simultaneously adjustable by relative axial movement of said sleeve and said collet member.

The aforementioned sleeve may usefully be mounted for rotation within said housing in any conventional manner but the use of roller bearings for this purpose has proved to be highly effective. Such rollers bearings are preferably arranged so as to provide axially oppositely directed thrust forces.

The adjustment of the radial positions of the aforementioned fingers on relative axial movement of the sleeve and the collet member is preferably obtained by the provision on said collet member and on said sleeve of co-operating internal and external frusto conical surfaces. The relative axial movement of the sleeve and the collet member can in turn usefully be obtained by the provision of co-operating screw threads on the collet member and in an adjusting collar abutting one end of the sleeve so that, on rotation of such adjusting collar relative to the collet member, the collet member is moved axially relative to the surrounding sleeve in turn to cause the desired radial movement of the collet fingers. In order to facilitate adjustment of the steady rest, means are preferably provided for temporarily securing the sleeve to the housing to prevent rotation of the sleeve during rotation of the adjusting collar for the purpose of effecting said radial movements of the collet fingers. Such means may, for instance, comprise a pin mounted for axial movement through said housing from a retracted position permitting rotation of said sleeve and an extended position in which the pin is received within a peripheral depression in said sleeve to prevent rotation of the latter.

Locking means are also usefully provided to prevent undesired relative rotation of the adjusting collar and the collet member during operation on a workpiece secured within the steady rest to avoid all risk of accidental loosening of the collet fingers from the workpiece. A ratchet and a co-operating pawl may be provided for this purpose.

By the use of collet members of equal external diameters but having collet fingers of different radial thicknesses, the steady rests of the present invention may be utilized for supporting cylindrical workpieces having a wide range of external diameters.

Figure 3:
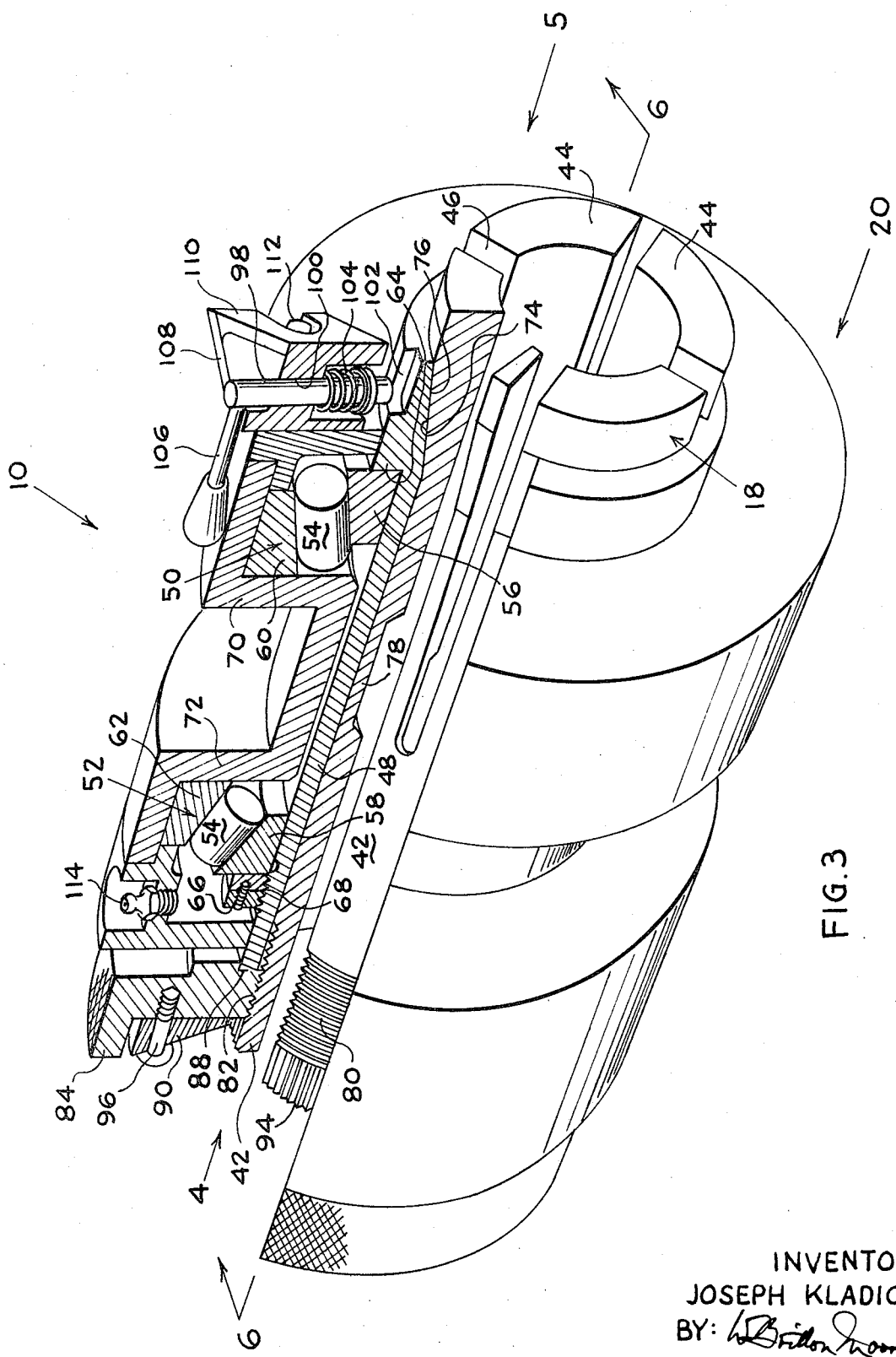
Figure 5:
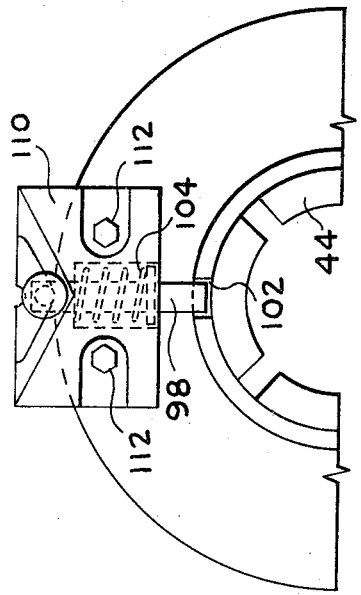
Figure 4:
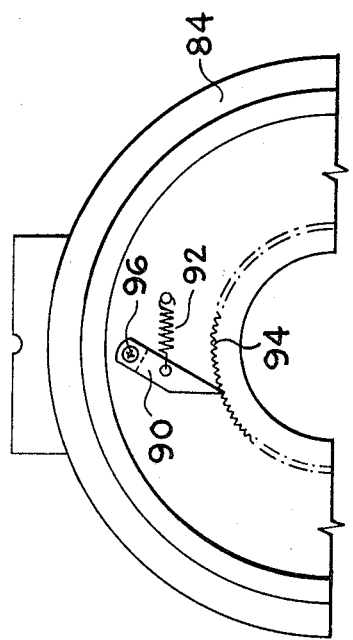
Figure 7:
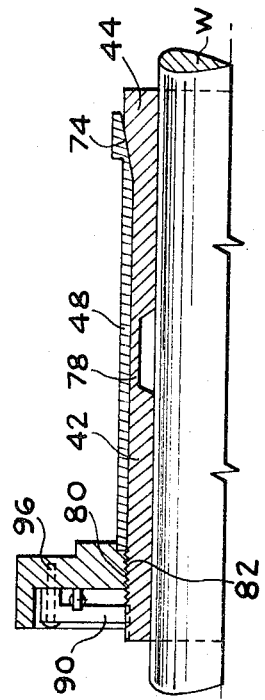
Figure 6:
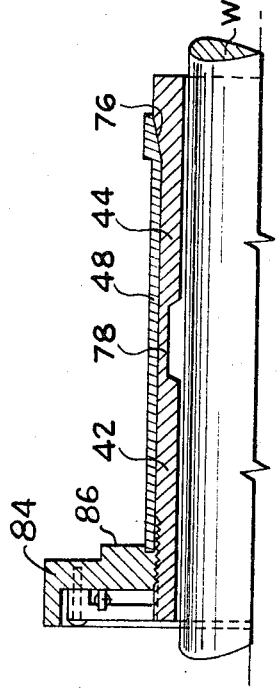

The invention will now be described merely by way of illustration with reference to the accompanying drawings in which:

FIG. 1 is a partial perspective view of an engine lathe fitted with a steady rest according to the invention, FIG. 2 is a transverse sectional view showing the manner in which the steady rest of FIG. 1 is secured to the lathe, FIG. 3 is an enlarged perspective view of the steady rest of FIG. 1 with certain parts cut away to show the internal construction, FIG. 4 is a partial elevation of the steady rest of FIG. 3 when viewed in the direction of the arrow 4 of that figure, FIG. 5 is a partial elevation of the steady rest of FIG. 3 when viewed in the direction of the arrow 5 of that figure, FIG. 6 is a partial vertical section along the line 6—6 of FIG. 3 with certain parts omitted for the sake of clarity and showing the collet member out of engagement with a workpiece, and FIG. 7 is a view similar to that of FIG. 6 but showing the collet member in engagement with the workpiece.

Referring first to FIG. 1, it will be seen that the steady rest mechanism according to the invention and generally indicated at 10 is mounted on a lathe having a headstock 12, a workpiece-holding chuck 13 and longitudinal ways 14 and 16. As hereinbefore indicated, the steady rest mechanism 10 comprises a rotatable self-centering chuck mechanism 18 and a non-rotatable housing generally indicated at 20.

The housing 20 may be mounted on the lathe in any convenient manner and, in the arrangement shown in the drawings, this mounting is effected by a support frame 22 secured to the base of the lathe by a bolt 24 and a nut 26. The housing 20 is secured to the frame 22 by means of a semicircular saddle 28 and a semicircular clamp 30 pivoted at 32 to the saddle 28. The latter is provided with a generally U-shaped member 34 pivoted at 36 for rotation in a vertical plane between an "unlocked" position permitting retraction of clamp 30 and a "locked" position in which clamp 30 is held in its downward position by the engagement of a clamping screw 38 with a tongue 40 extending from the clamp 30. W".

The dimensions of the frame 22 are such that the center of the steady rest 10 is axially aligned with the center of the chuck 13 holding the workpiece "W."

It will be appreciated that a steady rest in accordance with the invention may be mounted on a lathe in any appropriate manner and that the arrangement shown in FIGS. 1 and 2 is given merely by way of illustration.

Referring now to FIG. 3, it will be seen that the steady rest comprises a self-centering chuck mechanism 18 and the non-rotatable housing 20. The chuck mechanism 18 for holding the workpiece W (not shown in FIG. 3) is in the form of a generally cylindrical collet member 42 having four axially extending fingers 44, each of which in transverse section extendes substantially around one quadrant of the workpiece W, allowance of course being made for the small peripheral separation 46 provided between the fingers 44.

The collet member 42 is surrounded by a sleeve 48, the axial position of which relative to said collet member 42 can be adjusted in a manner to be described hereinafter.

In the construction shown in the drawings, the chuck mechanism 18 is mounted for rotation within the housing 20 by means of axially separated roller bearings 50 and 52, each comprising a plurality of rollers 54 supported by rotatable bearing blocks 56 and 58 and non-rotatable bearing blocks 60 and 62. It should be noted that, in accordance with a preferred feature of the invention, the bearings 50 and 52 are so arranged that, in use, the resulting thrust forces are directed in axially opposite directions.

The thrust forces acting on the sleeve 48 are received against a radially extending forward flange 64 while, at the rearward end of the sleeve 48, the forces are received by a lock nut arrangement 66 threadably received at 68 on the sleeve 48. The non-rotatable bearings blocks 60 and 62 are supported by radial flanges 70 and 72 respectively forming part of the housing 20.

In order to provide the desired radial movement of the fingers 44 for gripping a workpiece, the collet member 42 is provided with an external frusto conical surface 74. This surface 74 is disposed so as to abut a corresponding internal frusto conical surface 76 provided at the forward end of the sleeve 48 so that, on relative axial movement of the sleeve 48 and the collet member 42, the required radial movement of the collet fingers 44 is obtained. In order to facilitate such radial movement of the collet fingers 44, these fingers are constructed with reduced radial thicknesses at their rearward extremities as shown at 78.

The required relative axial movement of the sleeve 48 and the collet member 42 is usefully obtained by the provision of an external thread 80 on the rearward end of the collet member 42. This thread 80 engages an internal thread 82 provided in a knurled adjusting collar 84 which has a radial surface 86 which in turn abuts the rearward end surface 88 of the sleeve 48. For reasons which will become apparent as the description proceeds, the knurled collar 84 is provided with a ratchet pawl 90 normally maintained by a tension spring 92 (FIG. 4) in engagement with a male ratchet gear 94 with axially extending teeth provided at the rearward end of the collet member 42. The pawl 90 is rotatably mounted on collar 84 by a bolt 96.

At the forward end of the housing 20, a locking pin 98 is mounted for radial movement in a passageway 100. A peripheral depression 102 is provided in the forward end of the sleeve 48 for receiving the end of the pin 98 when the latter is in its extended position. A helical compression spring 104 is disposed about the pin 98 normally to urge the latter radially inwardly. In order to prevent such inward radial movement of the pin 98, the latter is provided with a handle 106, the shaft of which engages a cam surface 108. In the position shown in FIG. 3, the pin 98 is maintained in its radially outward position by engagement of the shaft of the handle 106 with the cam surface 108. On rotation of the handle 106, the pin is urged under the action of spring 104 into the depression 102 in the sleeve 48 so as to occupy the position shown in FIG. 5. In the construction shown in the drawings, the support block 110 carrying the pin 98 is mounted on the forward end of the housing 20 by bolts 112.

It will be appreciated that provision will normally be made for the lubrication of the bearings 50 and 52 and of all relatively moving surfaces. To this end, a grease nipple 114 is illustrated in FIG. 3.

The operation of a steady rest according to the invention will now be described with particular reference to FIGS. 3, 6 and 7. Having inserted the workpiece W into the steady rest 10 and having secured the rearward end in the chuck 13, the pin 98 is released by rotation of the handle 106 to permit the former to move under the influence of spring 104 into the depression 102. The knurled collar 84 is then rotated so as to retract the collet member 42 in a rearward direction from the position shown in FIG. 6 to that shown in FIG. 7. During this rearward movement of the collet member 42, the surface 74 of the latter engages the surface 76 of the sleeve 48 and this urges the fingers 44 radially inwardly to grip the workpiece as shown in FIG. 7. During this relative rotation of the collet member 42 and the sleeve 48, the pawl 90 will slip over the teeth of the ratchet gear 94. The pin 98 is next retracted from the depression 102 by rotation of the handle 106 to permit free rotation of the collet member 42 and the sleeve 48 on roller bearings 50 and 52 during machining operations on the workpiece W. When such operations have been completed, the workpiece may be released from the steady rest by rotating handle 106 to allow pin 98 to enter depression 102, releasing ratchet gear 94 by retracting pawl 90 and then rotating the knurled collar 84 in the opposite direction to that previously described.

It will be appreciated that, by the use of collet members having fingers of different radial thicknesses, the steady rest shown in the drawings may be utilized for accommodating workpieces with a wide range of external diameters.

While I have described herein and shown for purposes of illustrating the principle of my said invention, certain means and arrangements thereof for carrying my invention into practice, it is obvious that various modification and changes may be made therein by persons skilled in the art. I, therefore, do not wish to be limited to the precise details set out herein but desire to avail myself of such modifications and embodiments as come within the scope of the claims appended hereto.

What I claim is:

1. A steady rest for use with a lathe and comprising a rotatable self-centering chuck mechanism for securing a workpiece extending therethrough and mounted for free rotation within a non-rotatable housing adapted to be secured to such a lathe, and which self-centering chuck mechanism in turn comprises a generally cylindrical sleeve and an axially movable collet member disposed therein, said collet member having at least three equi-angularly radially spaced and axially extending fingers for gripping a workpiece extending through said chuck mechanism, the radial positions of all said fingers being simultaneously adjustable on relative axial movement of said sleeve and said collet member by virtue of the provision on said collet member and on said sleeve of co-operating frusto-conical surfaces, an adjusting collar screwed on said collet member and terminally abutting said sleeve to cause relative axial movement of said sleeve and said collet member on relative rotation of said adjusting collar and said collet member, and means for preventing undesired relative rotation of said collet member and said adjusting collar during operation on a workpiece secured within said chuck mechanism.

2. A steady rest as claimed in claim 1 in which means are additionally provided for temporarily securing said sleeve to said housing to prevent rotation of said sleeve during rotation of said adjusting collar for the purpose of effecting said radial movement of said fingers of said collet member.

3. A steady rest as claimed in claim 2 in which said means for temporarily securing said sleeve to said housing comprises a pin mounted for axial movement through said housing from a retracted position permitting rotation of said sleeve and an extended position in which said pin is received within a peripheral depression in said sleeve to prevent rotation of the latter.

4. A steady rest as claimed in claim 1 in which said means for preventing undesired relative rotation of said collet member and said adjusting collar comprises a ratchet gear and a co-operating pawl secured to said collet member and said adjusting collar.

5. A steady rest as claimed in claim 4 in which said ratchet gear comprises axially extending teeth formed on said collet member and in which said pawl member is pivotally mounted on said adjusting collar for releasable engagement with said ratchet teeth, and in which steady rest spring means are connected to said pawl member to urge said pawl member into releasable engagement with said ratchet teeth.

* * * * *